(12) United States Patent
Koga

(10) Patent No.: US 6,251,039 B1
(45) Date of Patent: Jun. 26, 2001

(54) TORODIAL CONTINUOUS VARIABLE TRANSMISSION

(75) Inventor: Hidetaka Koga, Kanagawa (JP)

(73) Assignee: Isuzu Motors, Ltd., Tokyo (JP)

( * ) Notice: Subject to any disclaimer, the term of this patent is extended or adjusted under 35 U.S.C. 154(b) by 0 days.

(21) Appl. No.: 09/497,407

(22) Filed: Feb. 3, 2000

(30) Foreign Application Priority Data

Feb. 3, 1999 (JP) .................................................. 11-026193

(51) Int. Cl.[7] .................................................. F16H 37/02
(52) U.S. Cl. .................................................. 475/216
(58) Field of Search ..................... 475/216, 214

(56) References Cited

U.S. PATENT DOCUMENTS

| 5,607,372 | 3/1997 | Lohr . | |
| 6,059,685 | * 5/2000 | Hoge et al. | 475/216 |
| 6,099,431 | * 8/2000 | Hoge et al. | 475/216 |

* cited by examiner

*Primary Examiner*—Dirk Wright
(74) *Attorney, Agent, or Firm*—Browdy & Neimark

(57) ABSTRACT

A continuous variable transmission is disclosed wherein the planetary gearset arranged downstream of the toroidal transmission mechanism is made simple in construction to reduce the overall axial length. To cope with this, a first planetary gearset arranged downstream of the toroidal transmission mechanism is comprised of a first carrier, a sun gear connected to an output disk, and a ring gear. The first carrier supports thereon a dual pinion having a first and second planet-gears. The ring gear may come in engagement with the second planet-gear through a first clutch for low-range operation. The combined construction of the first and second planetary gearsets contributes to the reduction of the axial length in the gearing mechanism. The second clutch for high-range operation may hold the second ring gear to a stationary case.

3 Claims, 3 Drawing Sheets

TORODIAL CONTINUOUS VARIABLE TRANSMISSION

BACKGROUND OF THE INVENTION

1. Field of the Invention

The present invention relates to a toroidal continuous variable transmission adapted for the vehicle such automobiles.

2. Description of the Prior Art

In most toroidal continuous variable transmissions conventionally used incorporated in the transmission systems in automotive vehicles, the input and output shafts are arranged in a single row along the common centerline. To cope with many restrictions on the layout of the transmission systems, a countershaft having a gear meshed with an output gear connected to an output disk is arranged parallel to an input shaft astride the toroidal transmission mechanism while a spur gear mechanism is arranged-between the countershaft and the output shaft. For getting the rotation of the output disk to the output shaft, thus, either engaging or disengaging a clutch incorporated in the automotive power train brings the output shaft any one of the forward, reverse and neutral. Nevertheless, this prior construction raises major problems of rendering the continuous variable transmission too bulky in its diameter to mount efficiently the transmission to the automotive vehicle.

Among continuous variable transmissions having toroidal continuous variable transmission mechanisms is known a continuous variable transmission, as shown in FIG. 3, in which the input and output shafts are arranged in a single row on the common centerline and the rotation of the input shaft may be transmitted to the output shaft with forward speeds, neutral and reverse by speed-changing operation of the toroidal transmission mechanism without no provision of the countershaft so that the continuous variable transmission is reduced in the diametric dimension. Refer to, for example, the disclosure in U.S. Pat. No. 5,607,372.

The continuous variable transmission shown in FIG. 3 is a continuous variable transmission including therein a toroidal continuous variable transmission mechanism of double cavity type. The toroidal continuous variable transmission mechanism is comprised of a first toroidal transmission unit 8 and a second toroidal transmission unit 9, which are arranged on an input shaft 1 in opposition to each other. The first toroidal transmission unit 8 includes a first input disk 2, a first output disk 3 arranged confronting the first input disk 2, and pivoting power rollers 6 to transmit torque from the first input disk 2 to the first output disk 3, while the second toroidal transmission 9 has a second input disk 4, a second output disk 5 arranged confronting the second input disk 4, and pivoting power rollers 7 to transmit torque from the second input disk 4 to the second output disk 5. The power rollers 6, 7 are each for rotation on its own rotating axis 11 and also supported by a trunnion, not shown, for pivoting motion about its associated pivotal axis 12 that is normal to the rotating axis 11 and normal to the plane surface of this paper. This makes it possible to pivot the power rollers 6, 7 in cooperation with each other whereby the speed ratio may be varied infinitely in accordance with pivoting angles of the power rollers 6, 7 about the pivotal axes 12.

While the torque transmission between any paired confronting input and output disks 2, 4 and 3, 5 through the power rollers 6, 7 depends on a shearing force or traction (viscous-frictional force) of hydraulic fluid, the desired tractive effort should require much contact force acting along the axis of the transmission at areas where the power rollers 6, 7 come in rolling-contact with the input and output disks 2, 4 and 6, 7. To cope with this, the prior toroidal transmission mechanism is commonly provided with a loading cam 10, or means for adjusting a contact pressure of the power rollers 6, 7 against the disks, depending on the magnitude of the torque that is applied to the input disks 2, 4 from the input shaft 1. In the prior transmission illustrated, a pair of output disks 3, 5 are made integrally with one another. Reference letters A and B in the accompanying drawing denotes rotational directions of the input and output shafts, respectively. The input shaft 1 extends to the output end, passing through the input and output disks 2, 4 and 3, 5 of the toroidal transmission mechanisms 8, 9. A hollow drive shaft 15 integral with the output disks 3, 5 fits over the input shaft 1 for free rotation and also supports thereon the second input disk 4 for rotation.

The torque applied to the input shaft 1 from the engine is transmitted to the first input disk 2 through the loading cam 10 and, at the same time, transmitted to the second input disk 4 past the input shaft 1. Rotation of the first input disk 2 by the transmitted torque causes the first power rollers 6 rotate so as to turn the first output disk 3. On the other hand, the torque transmitted to the second input disk 4 drives the second output disk 5 through the second power rollers 7. It will be understood that the first and second output disks 3, 5 are made in an integral structure to rotate together in unison. When the power rollers 6, 7 are pivoted about their pivotal axes for a desired angle in synchronized relation with one another in the event during which the torque is transmitted, the rolling-contact locations of the power rollers 6, 7 with the input and output disks 2, 4 and 3, 5 moves infinitely, thereby resulting in making the transmission ratio vary in a continuous manner.

Arranged downstream of the second toroidal transmission unit 9 is a drive mechanism 46 that is in coaxial relation with both of the input shaft 1 and hollow drive shaft 15 and establishes a power train between the input shaft 1 and the hollow shaft 15. The drive mechanism 46 is comprised of a first sun gear 47 integral with the input shaft 1, a carrier 48 mounted on the input shaft 1 and also connected integrally with the second input disk 4, a torque tube 52 supported for rotation on an extension 14 of the input shaft 1, a second sun gear 53 provided on the torque tube 52 at the upstream end thereof, and a pinion 49 commonly referred as step-gear. The pinion 49 is supported for rotation at a middle journal thereof and has a gear 50 meshed with the first sun gear 47 and another gear 51 meshed with the second sun gear 53, the gears 50 and 53 being arranged on axially opposite ends of the middle journal, one to each end. With the construction as described just above, as the first sun gear 47 is opposite in rotating direction to the carrier 48, the pinion 49 revolves around the first sun gear 47, spinning on its own axis, to thereby rotate the torque tube 52 in the same rotating direction as the hollow drive shaft 15.

Rotation of the drive mechanism 46 is transmitted through the torque tube 52 to an output gearing mechanism 54 consisting of first and second planetary gearsets 55 and 56. The first planetary gearset 55 comprises a third sun gear 57 attached to the torque tube 52, a first pinion 58 supported for rotation on a mount member 60 fixed to a stationary case and meshing with the third sun gear 57, and a first ring gear 59 in mesh with the first pinion 58. The second planetary gearset 56 includes a fourth sun gear 61 attached to the torque tube 52, a second pinion 62 supported for rotation to a carrier 64, and a second ring gear 59 connected to the extension 14 of the input shaft 1 and meshing with the second pinion 62. The first ring gear 59 of the first planetary gearset 55 and the carrier 64 of the second planetary gearset 56 extend downstream so as to be selectively connected to the output shaft 40 via either a high-range clutch 65 or low-range clutch 66.

When engaging the high-range clutch 65 whereas disengaging the low-range clutch 66, the transmission ratio becomes the high-range operation. In contrast, when the low-range clutch 66 is engaged to select the low-range operation, the second ring gear 63 rotates in the same direction as the direction A of the input -shaft 1. The fourth sun gear 61, however, rotates in the opposite direction B, but at a speed varying depending on a magnitude of transmission ratio of the toroidal transmission units 8, 9. Although the output shaft 40 may is turned at a revolving speed of the second pinion 62, but shifted into any one of forward, neutral and reverse, depending on the rotating speed of the fourth sun gear 61, which varies in accordance with the speed-changing operation at the toroidal transmission units 8, 9. Moreover, the rotating speed of the fourth sun gear 61 affects the magnitude of rotating speed of the output shaft 40 at forward and reverse rotation. When the toroidal transmission units 8, 9 provide the transmission ratio of the maximum overdrive, the overall transmission comes in reverse. In contrast, when the toroidal transmission units 8, 9 provide the transmission ratio of the maximum reduction, the overall transmission comes in forward. Thus, any transmission ratio between the maximum overdrive and the maximum reduction may render the overall transmission neutral and no torque converter or clutch is necessary even under some conditions, as in starting a stationary vehicle. The transmission constructed as described above makes it possible to eliminate the countershaft arranged parallel to an input shaft astride the input disk, thereby resulting in reducing the overall diametric size of the transmission.

Nevertheless, the continuous variable transmission having the toroidal continuous variable transmission as described above needs the components: the step-gear for the pinion 49 revolving just as the planet in the drive mechanism 64, and first and second pinions 58, 62 in the first and second planetary gearsets 55, 56, respectively, in the output gearing mechanism 54. In addition, the drive mechanism 46 and output gearing mechanism 54 are arranged in series along the same axial direction. Thus, the prior continuous variable transmission has a major problem of becoming much longer in the overall length of the transmission. Taking into account the major problem that the in-line arrangement of the drive mechanism and the output gearing mechanism along the common centerline results in increasing the overall length of the transmission, it may be worthwhile considering incorporating or uniting any one of the planetary gearsets into the drive mechanism and arranging another planetary gearset downstream of the drive mechanism so as to arrange the planetary gearsets in two row, thereby providing selectively any one of forward motion, neutral and reverse in the overall transmission in accordance with the speed-changing operation at the toroidal transmission units, and further making it possible to reduce overall length of the transmission.

SUMMARY OF THE INVENTION

The present invention has for its primary object to overcome the problems in the prior art as described just above and in particular to provide a continuous variable transmission made less in overall length, which makes it possible to provide wide or large transmission ratio spread in the overall transmission, no matter how small the transmission ratio spread of the toroidal transmission mechanism.

The present invention is concerned with a continuous variable transmission comprising a toroidal transmission mechanism, a first planetary gearset and a second planetary gearset, the toroidal transmission mechanism being comprised of at least one pair of toroidal transmission units, each of which comprises an input disk revolving integrally with an input shaft, an output disk arranged confronting the input disk and supported for rotation on the input shaft, and power rollers arranged between the confronting input and output disks and supported for pivoting motion on a stationary case, the first planetary gearset being comprised of a hollow drive shaft connected integrally with the output disk and fitting over the input shaft for relative rotation, a first sun gear connected integrally with the hollow drive shaft, a first pinion, a first carrier connected integrally with the input shaft and supporting thereon the first pinion for rotation, and a first ring gear, the second planetary gearset being comprised of a second sun gear transmitted with a torque from the first pinion, a second pinion, a second carrier supporting thereon the second pinion for rotation, and a second ring gear, the first pinion in the first planetary gearset being of a dual pinion that is made with a first planet-gear meshing with the first sun gear and a second planet-gear meshing with both the first planet-gear and the first ring gear, the second pinion in the second planetary gearset being of a dual pinion that is made with a third planet-gear meshing with the second sun gear and a fourth planet-gear meshing with both the third planet-gear and the second ring gear, the first ring gear coming in engagement with the second carrier through a first clutch and the second ring gear coming in engagement with the stationary case through a second clutch, whereby the torque of the second carrier is transmitted to an output shaft that is connected integrally with the second carrier.

In another aspect of the present invention, a continuous variable transmission is disclosed, wherein the toroidal transmission mechanism is of a double cavity type including a first toroidal transmission unit that comprises a first input disk revolving integrally with the input shaft, a first output disk arranged confronting the first input disk and supported for rotation on the input shaft, and first power rollers arranged between the confronting first input and first output disks and supported for pivoting motion on the stationary case, and a second toroidal transmission unit that comprises a second output disk integral with the first output disk, a second input disk arranged confronting the second output disk and connected to the input shaft, and second power rollers arranged between the confronting second input and second output disks and supported for pivoting motion on the stationary case. Moreover, the input shaft extends passing through both the first toroidal transmission unit and the second toroidal transmission unit, and the hollow drive shaft supports thereon the second input disk for rotation.

In a further another aspect of the present invention, a continuous variable transmission is disclosed, wherein when low-range operation is selected, the first clutch comes in engagement while the second clutch is disengaged and, in contrast, when the high-range operation is selected, the second clutch comes in engagement while the first clutch is disengaged, so that the high-range and low-range change over one another in a condition where the speed ratio in the toroidal transmission mechanism reaches a substantial upper limit.

In accordance with the continuous variable transmission constructed as described above, the torque applied to the input disk from the input shaft is transmitted through the rolling-contact power rollers to the output disk that is connected integrally with the hollow drive shaft. Thus, the applied torque is transferred to the sun gear connected with the hollow drive shaft. When the low-range operation is selected, the torque transferred to the sun gear in the first planetary gearset is transmitted through the first pinion to the first ring gear and further through the first clutch and second carrier to the output shaft. In contrast, when the high-range operation is selected, the torque transferred to the sun gear in the first planetary gearset is transmitted to the second sun gear in the second planetary gearset and finally applied to the output shaft through the second carrier supporting the second pinion that meshes with both the second sun gear and the second ring gear.

In accordance with the toroidal transmission mechanism of double-cavity type in which the input and output shafts are arranged along the common centerline, and the input shaft fits for relative rotation in the hollow drive shaft connected at one end thereof with the second output disk while at another end thereof with the sun gear, it is allowed to eliminate the countershaft arranged parallel to the input shaft astride the second input disk and the second output disk, thereby resulting in reducing the overall diametric size of the transmission.

In accordance with the present invention, moreover, a dual-type pinion is employed as a planet-pinion in the planetary gearset, which is made thereon with a first planet-gear and a second planet-gear. This construction makes it possible to transmit the torque from a sum gear less in number of teeth to a ring gear much more in number of teeth, resulting in providing the large transmission ratio spread for the overall continuous variable transmission system.

With the continuous variable transmission constructed as described above, the drive mechanism coaxial with the toroidal transmission units is combined or united with any one gearset out of the planetary gearsets that have been conventionally arranged in two rows downstream of the drive mechanism. This design permits eliminating one gearing stage thereby reducing the overall length of the transmission. According to the present invention, the second clutch for high-range operation out of two clutches further is attached to the stationary case mounted with a hydraulic piston. This construction makes possible easier piping of hydraulic lines. Moreover, the hydraulic piston for actuating the clutch is held stationary, and therefore subject to no centrifugal force, which might otherwise let the hydraulic fluid pressure for clutching operation fluctuate owing to variation in the rotating speed of the clutch.

In the continuous variable transmission employing the toroidal transmission mechanism of double-cavity type, the input and output shafts are arranged along the common centerline, and the input shaft fits for relative rotation in the hollow drive shaft connected at one end thereof with the second output disk while at another end thereof with the sun gear, after passing through the center bore of the second input disk. This construction makes it possible to eliminate the countershaft, which has been conventionally arranged parallel to the input shaft astride the second input disk, thereby resulting in reducing the overall diametric size of the transmission.

Other objects and many of the attendant advantages of this invention will be readily appreciated as the apparatus becomes better understood by reference to the following detailed description when considered in connection with the accompanying drawings.

DETAILED DESCRIPTION OF THE PREFERRED EMBODIMENTS

Figure 1:
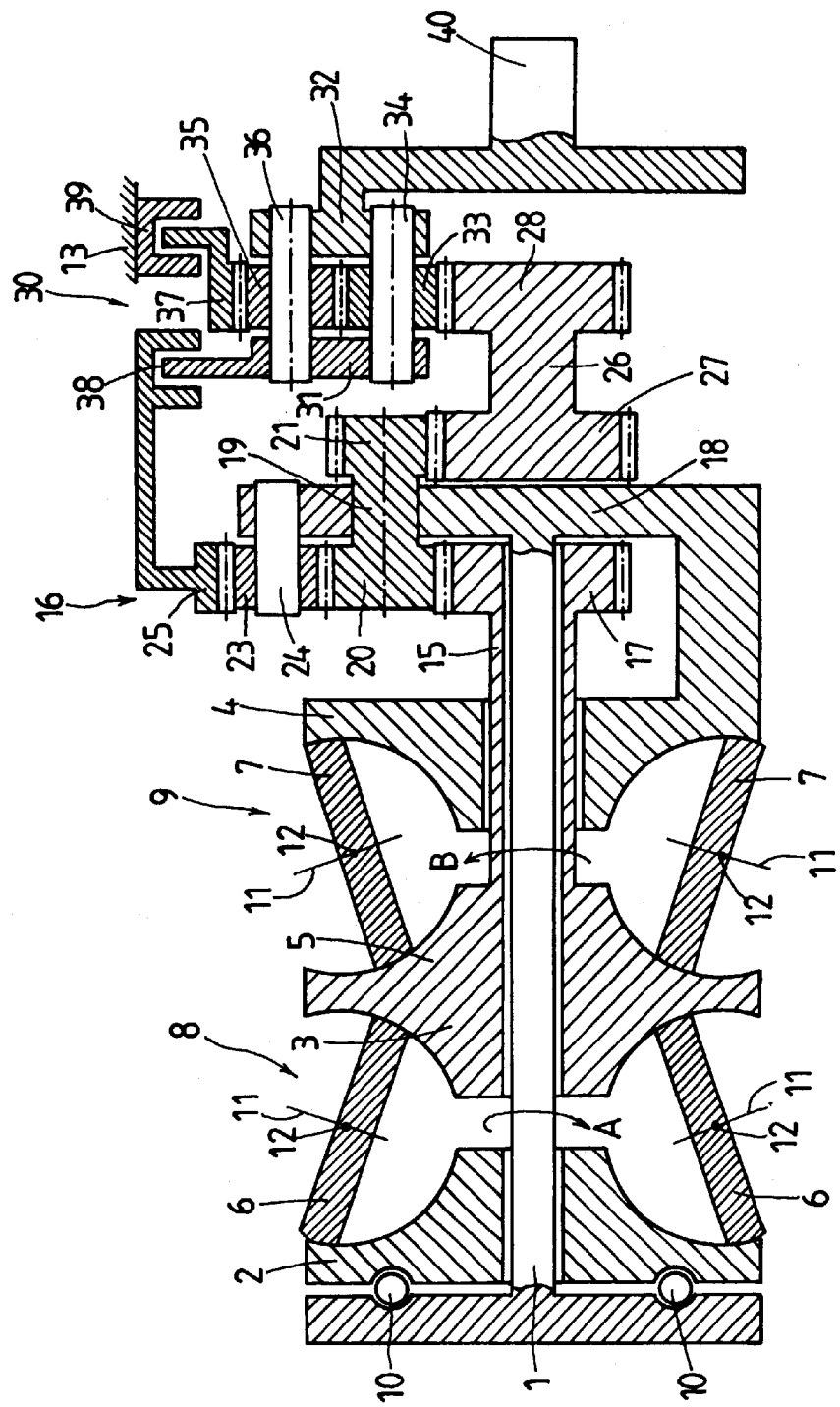
FIG. 1 is a schematic view illustrating a preferred embodiment of a continuous variable transmission in accordance with the present invention.
Figure 3:
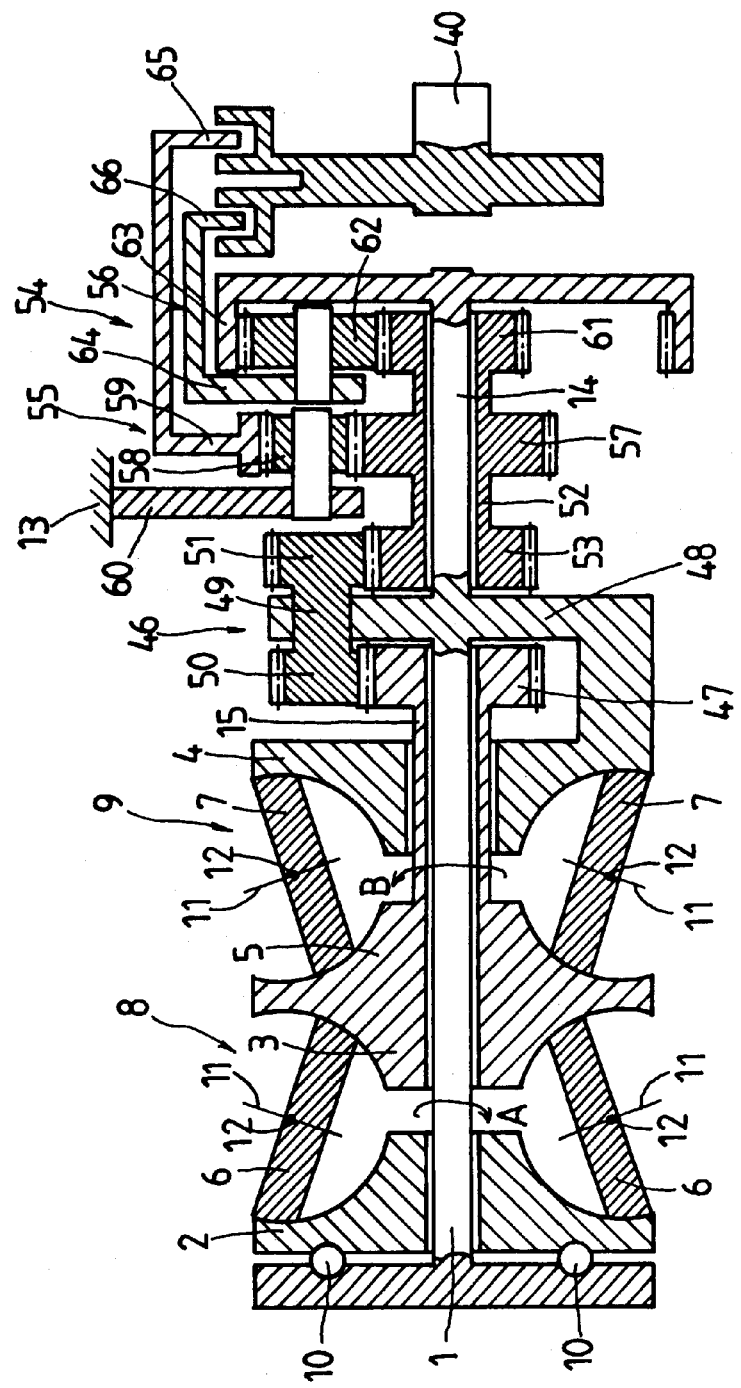
FIG. 3 is a schematic illustration showing a prior continuous variable transmission.

An embodiment of the continuous variable transmission according to the present invention will be explained below with reference to the accompanying drawings. The continuous variable transmission shown in FIG. 1, likewise with the prior continuous variable transmission in FIG. 3, is provided with two set of toroidal continuous variable transmission units 8, 9 of double-cavity type, which are arranged confronting one another along the common centerline. As the toroidal continuous variable transmission units 8, 9 in this embodiment are identical in construction with the toroidal continuous variable transmission units 8, 9 described above in reference to FIG. 3, similar reference characters designate similar elements or components in the following description and the previous description will be applicable.

The hollow drive shaft 15 connected with the second output disk 5 extends through a center bore of the second input disk 4 confronting the second output disk 5 and supports thereon the second input disk 4 for rotation. The input shaft 1 fits in the hollow drive shaft 15, which is thus supported for rotation relative to the input shaft 1. In the drawing, a reference letter A denotes the rotating direction of the input disks 2, 4 while a reference letter B is the rotating direction of the output disks 3, 5.

The toroidal transmission units 8, 9 are coupled to the output shaft 40 through first and second planetary gearsets 16, 30 offset with respect to the common centerline of the toroidal transmission units 8, 9. The first planetary gearset 16 is of a dual pinion type that is comprised of a first sun gear 17 connected integrally to the hollow drive shaft 15 at the end opposite to the first input disk 2, a first carrier 18 connected integrally with both the input shaft 1 and the input disk 4, a first step-gear 19 supported for rotation on the first carrier 18 and provided with a first planet-gear 20 meshing with the first sun gear 17, a second planet-gear 23 supported for rotation on a shaft 24 to mesh with the first planet-gear 20, and a first ring gear 25 meshing with the second planet-gear 23. The first and second planet-gears 20, 23, in combination, constitutes a first planet-pinion in the first planetary gearset 16.

Another gear 21 in the step-gear 19 comes in mesh with a gear 27 of a step-gear 26 that is in coaxial relation with the input shaft 1. The second planetary gearset 30 arranged in juxtaposition with the first planetary gearset 16 is of a dual pinion type similarly to the first planetary gearset 16. The second planetary gearset 30 is comprised of a second sun gear 28 provided on the step-gear 26 at the end opposite to the gear 27, a third planet-gear 33 supported on a shaft 34 borne for rotation by second carriers 31, 32, a fourth planet-gear supported on a shaft 36 borne for rotation by the second carriers 31, 32 to mesh with the third planet-gear 33, and a second ring gear 37 meshing with the fourth planet-gear 35. The third and fourth planet-gears 33, 35, in combination, constitutes a second planet-pinion in the second planetary gearset 30.

The first ring gear 25 in the first planetary gearset 16 may come in coupling with the second carrier 31 in the second planetary gearset 30 through a first clutch 38. On the other hand, the second ring gear 37 in the second planetary gearset 30 may come in coupling with the case 13 through a second clutch 38. With the transmission embodied as described above, the first pinion associated with the step-gear 19 is formed in a dual pinion, which meshes at the periphery thereof with the first ring gear 25 to provide the first planetary gearset 16. Compared with the continuous variable transmission shown in FIG. 3, the continuous variable transmission embodying the present invention saves any one of the planetary gearsets that have been incorporated in the output gearing mechanism 54.

The toroidal transmission mechanism in the continuous variable transmission constructed as described above may operate likewise with the toroidal transmission mechanism in FIG. 3, so that the previous description will be applicable. On operation of the toroidal transmission units 8, 9, the output disks 3, 5 and the hollow drive shaft 15 connected to the output disks 3, 5 are rotated in a direction opposite to the input disks 2, 4. In the first planetary gearset 16, the rotation of the hollow drive shaft 15 makes the first sun gear 17 turn, whereas the input shaft 1 rotates the first carrier 15 in the direction opposite to the first sun gear 17.

When the input shaft 1 is driven under a condition where the first clutch 38 for low-range operation is engaged and the second clutch 39 for high-range operation remains disengaged, both the first ring gear 25 in the first planetary gearset 16 and the second carriers 31, 32 are held stationary to thereby provide a low-range operation. In this event, the torque may be transferred from the first ring gear 25 to the output shaft 40 through the second carriers 31, 32. When the toroidal transmission mechanism operates with a transmission ratio, or reduction ratio: input rpm/output rpm, which is less in absolute value, in other words, with a speed ratio: the reciprocal of the transmission ratio, which is large in absolute value, the first sun gear 17 is made to turn faster and the first planetary gearset 20 rotates in forward while the second planetary gearset 23 turns reverse. Thus, the reverse rotation of the first ring gear 25 exceeds the forward rotation of the first carrier 18 so that the overall rotation of the continuous variable transmission becomes negative, as referred to an operating zone R in FIG. 2 where the speed ratio in the toroidal transmission mechanism is represented by negative numbers because the output disk of the toroidal transmission mechanism is reversed in rotation direction with respect to the input disk.

If the transmission ratio, or the reduction ratio, of the toroidal transmission mechanism increases in absolute value, in other wards if the speed ratio becomes less in absolute value, the rotation of the first sun gear 17 becomes slow. Thus, the effect of the forward rotation of the first carrier 18 becomes much larger with the rotation of the input shaft whereby the first ring gear 25 starts out in forward rotation to drive the output shaft 40 in forward operation. This makes the speed ratio of the overall continuous variable transmission vary so as to increase gradually along a solid line shown in FIG. 2, or over an operating zone FL in FIG. 2. On the course along which the speed ratio of the toroidal transmission mechanism increases, a neutral condition, or an operating point N in FIG. 2 appears, where the rotating speed of the output shaft 40 becomes zero.

Controlling the transmission may be carried out in such a manner that the first clutch 38 is disengaged and the second clutch 39 comes in engagement when the speed ratio of the overall transmission has reached the maximum with the first clutch 38 engaged, in accordance with a signal detecting the transmission ratio of the toroidal transmission mechanism. In this event where the first clutch 38 is disengaged whereas the second clutch 39 is in engagement, the first ring gear is allowed to turn freely so that the overall transmission shifts in high-range operation. As the transmission ratio, or the reduction ratio, of the toroidal transmission mechanism decreases in absolute value, in other wards, the speed ratio becomes much more in absolute value, the rotation of the first sun gear 17 becomes faster and the rotating speed of the step-gears 19, 26 increases. As a result, the spinning speed of the third and fourth planet-gears 33, 35 on their own axes becomes faster with respect to the second ring gear 37 kept stationary so that the rotation of the second carrier 31, 31, that is to say, the rotation of the output shaft 40, gets faster and faster whereby the speed ratio of the overall continuous variable transmission changes for the still faster as shown with a broken line in FIG. 2.

The following will explain about the speed ratio that may be obtained in accordance with the continuous variable transmission of the present invention. The notation is defined as follows.

I=speed ratio of the overall toroidal continuous variable transmission $I_{CVT}$=speed ratio of the toroidal transmission mechanism $Z_1$=number of teeth in the first sun gear $Z_2$=number of teeth in the gear 27

$Z_3$=number of teeth in the second sun gear $Z_4$=number of teeth in the first planet-gear 20

$Z_5$=number of teeth in the first ring gear $Z_6$=number of teeth in the gear 21

$Z_7$=number of teeth in the second ring gear 37

With the low-range operation selected, a rpm $w_{s^1}$ of the first sun gear 17 is given by $$w_{s^1} = I_{CVT} \times w_i;$$

Since an output rpm $w_o$ is identical with a rpm of the first ring gear 25, $$w_o = (Z_1/Z_5) \times w_{s^1} + (1 - Z_1/Z_5) \times w_i$$
$$= [(I_{CVT} \times (Z_1/Z_5) + 1 - Z_1/Z_5] \times w_i$$

A speed ratio $I_L$ of the toroidal continuous variable transmission of the present invention in the low-range operation may be then written as $$I_L = w_o/w_i = I_{CVT} \times (Z_1/Z_5) + 1 - Z_1/Z_5 \qquad [\text{Eq 1}]$$

In contrast, a rpm $w_{s^3}$ of the second sun gear 28 in the high-range operation is given by $$w_{s^3} = I_0 \times w_{s^1} + (1 - I_0) \times w_i$$
$$= (I_0 \times I_{CVT} + 1 - I_0) \times w_i$$

where $$I_0 = (Z_6 \times Z_1)/(Z_2 \times Z_4)$$

The following equation should be established between the output rpm $w_o$ and the rpm $w_{s^3}$ of the second sun gear 28:

$$(1 - Z_3/Z_7) \times w_o = -(Z_3/Z_7) \times w_{s^3}$$

Thus, the output rpm $w_o$ may be obtained from the following equation:

$$w_o = -[(Z_3/Z_7)/(1 - Z_3/Z_7)] \times (I_0 \times I_{CVT} + 1 - I_0) \times w_i$$

A speed ratio $I_H$ of the toroidal continuous variable transmission of the present invention in the high-range operation may be then derived as $$I_H = w_o/w_i = -[(Z_3/Z_7)/(1-Z_3/Z_7)] \times (I_0 \times I_{CVT} + 1 - I_0) \quad \text{[Eq 2]}$$

It is now assumed in both the first and second planetary gearsets 16, 30 that the number of teeth in the first sun gear 17 is 33; the number $Z_2$ of teeth in the gear 27, 32; the number $Z_3$ of teeth in the second sun gear 28, 35; the number $Z_4$ of teeth in the first planet-gear 20, 32; the number $Z_5$ of teeth in the first ring gear 25, 99; the number $Z_6$ of teeth in the gear 21, 33; and the number $Z_7$ of teeth in the second ring gear 37 is 82. Substituting these values in the range of from −0.54 to −2.3 of the speed ratio $I_{CVT}$ in the toroidal transmission mechanism, the transmission ratios $I_L$ and $I_H$ of the overall continuous variable transmission are derived from the above (Eq 1) and (Eq 2) and described in the following Table 1 and shown in FIG. 2. It is to be noted in FIG. 2 that a solid line indicates the transmission ratio $I_L$ in the low-range operation and the broken line is the transmission ratio $I_H$ in the high-range operation.

TABLE 1

| Transmission ratio $I_{CVT}$ of toroidal transmission mechanism | Transmission ratio I of overall continuous variable transmission | |
|---|---|---|
| −2.3 | $I_L$ | −1 |
| −2 | | 0 |
| −1.5 | | 0.1667 |
| −1 | | 0.3333 |
| −0.551 | | 0.483 |
| −0.551 | $I_H$ | 0.4837 |
| −1 | | 0.8393 |
| −1.5 | | 1.2352 |
| −2 | | 1.6312 |
| −2.3 | | 1.8688 |

Figure 2:
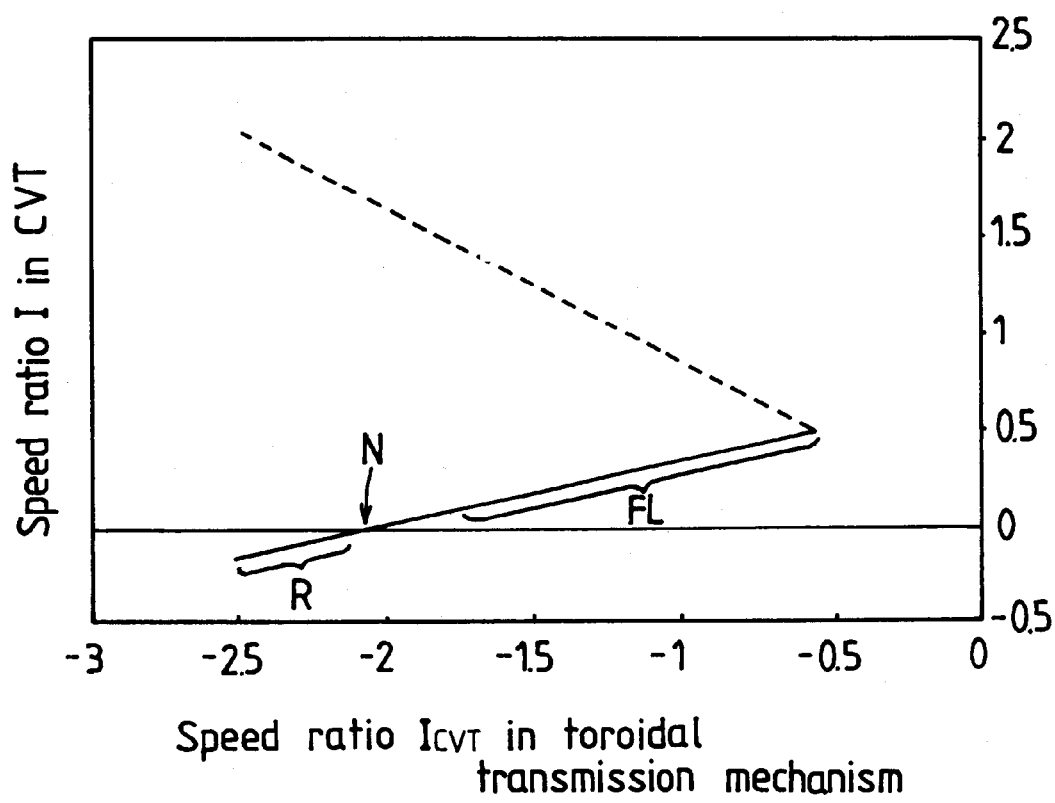
FIG. 2 is a graphic representation explaining relationship between speed ratio I in a continuous variable transmission and speed ratio $I_{CVT}$ in a toroidal transmission mechanism.

In FIG. 2, the speed ratio (T/M ratio) I of the continuous variable transmission is taken as the ordinate and the speed ratio $I_{CVT}$ of the toroidal transmission mechanism as the abscissa. As will be seen from Table 1 and FIG. 2, the toroidal continuous variable transmission of the present invention may provide large transmission ratio compared with the prior toroidal continuous variable transmission.

Having described the present invention as related to the embodiment in which the first planetary gearset 16 is arranged on the side of the first sun gear 17 in the first carrier 18, the first planetary gearset 16 may be arranged on the side of another gear 21 of the step-gear 19 in the first carrier 18. Moreover, although the planetary gearset 30 employed in the embodiment described above is of the dual pinion type having the third and fourth planet-gears 33, 35, it will be understood to those skilled in the art that the same effect may be accomplished by a modification in which the second planetary gearset 35 is formed in a single pinion type whereby the torque is transmitted through the first ring gear 25, second ring gear 37 and output shaft 40.

As the present invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalent of such meets and bounds are therefore intended to embraced by the claims.

What is claimed is:

1. A continuous variable transmission comprising a toroidal transmission mechanism, a first planetary gearset and a second planetary gearset, the toroidal transmission mechanism being comprised of at least one pair of toroidal transmission units, each of which comprises an input disk revolving integrally with an input shaft, an output disk arranged confronting the input disk and supported for rotation on the input shaft, and power rollers arranged between the confronting input and output disks and supported for pivoting motion on a stationary case, the first planetary gearset being comprised of a hollow drive shaft connected integrally with the output disk and fitting over the input shaft for relative rotation, a first sun gear connected integrally with the hollow drive shaft, a first pinion, a first carrier connected integrally with the input shaft and supporting thereon the first pinion for rotation, and a first ring gear, the second planetary gearset being comprised of a second sun gear transmitted with a torque from the first pinion, a second pinion, a second carrier supporting thereon the second pinion for rotation, and a second ring gear, the first pinion in the first planetary gearset being of a dual pinion that is made with a first planet-gear meshing with the first sun gear and a second planet-gear meshing with both the first planet-gear and the first ring gear, the second pinion in the second planetary gearset being of a dual pinion that is made with a third planet-gear meshing with the second sun gear and a fourth planet-gear meshing with both the third planet-gear and the second ring gear, the first ring gear coming in engagement with the second carrier through a first clutch and the second ring gear coming in engagement with the stationary case through a second clutch, whereby the torque of the second carrier is transmitted to an output shaft that is connected integrally with the second carrier.

2. A continuous variable transmission constructed as defined in claim 1, wherein the toroidal transmission mechanism is of a double cavity type including a first toroidal transmission unit that comprises a first input disk revolving integrally with the input shaft, a first output disk arranged confronting the first input disk and supported for rotation on the input shaft, and first power rollers arranged between the confronting first input and first output disks and supported for pivoting motion on the stationary case, and a second toroidal transmission unit that comprises a second output disk integral with the first output disk, a second input disk arranged confronting the second output disk and connected to the input shaft, and second power rollers arranged between the confronting second input and second output disks and supported for pivoting motion on the stationary case, and wherein the input shaft extends passing through both the first toroidal transmission unit and the second toroidal transmission unit, and the hollow drive shaft supports thereon the second input disk for rotation.

3. A continuous variable transmission constructed as defined in claim 1, wherein when low-range operation is selected, the first clutch comes in engagement while the second clutch is disengaged and, in contrast, when the high-range operation is selected, the second clutch comes in engagement while the first clutch is disengaged, so that the high-range and low-range change over one another in a condition where the speed ratio in the toroidal transmission mechanism reaches a substantial upper limit.

* * * * *